United States Patent
Flint

[19]

[11] Patent Number: 5,832,150
[45] Date of Patent: Nov. 3, 1998

[54] SIDE INJECTION FIBER OPTIC COUPLER

[75] Inventor: Graham W. Flint, Albuquerque, N. Mex.

[73] Assignee: Laser Power Corporation, San Diego, Calif.

[21] Appl. No.: 676,821

[22] Filed: Jul. 8, 1996

[51] Int. Cl.[6] .................................................. G02B 6/26
[52] U.S. Cl. ..................... 385/31; 385/146; 385/65; 385/83; 385/85; 385/43; 385/115
[58] Field of Search ..................... 385/115, 146, 385/88–94, 65, 83, 31, 38, 33, 85, 43

[56] References Cited

U.S. PATENT DOCUMENTS

| | | | |
|---|---|---|---|
| 4,688,884 | 8/1987 | Scifres et al. | 350/96.15 |
| 4,729,622 | 3/1988 | Pavlath | 385/11 |
| 4,820,010 | 4/1989 | Scifres et al. | 350/96.15 |
| 5,058,980 | 10/1991 | Howerton | 385/31 |
| 5,081,639 | 1/1992 | Snyder et al. | 372/101 |
| 5,127,068 | 6/1992 | Baer et al. | 385/34 |
| 5,168,401 | 12/1992 | Endriz | 359/625 |
| 5,293,269 | 3/1994 | Burkhart et al. | 359/719 |
| 5,293,440 | 3/1994 | Miles et al. | 385/51 |
| 5,600,744 | 2/1997 | Takahashi | 385/38 |

FOREIGN PATENT DOCUMENTS

| | | |
|---|---|---|
| 565843 | 10/1993 | European Pat. Off. . |
| 723323 | 7/1996 | European Pat. Off. . |
| 1615658 | 12/1990 | Russian Federation ............... 385/146 |

OTHER PUBLICATIONS

Edwards et al; "Ideal Microlenses for Laser to Fiber Coupling"; Journal of Light wave Technology, vol. 11, No. 2, pp. 252–257, Feb. 2, 1993.

*Primary Examiner*—John Ngo
*Attorney, Agent, or Firm*—Knobbe, Martens, Olson & Bear, LLP

[57] ABSTRACT

A fiber optic coupler for coupling an asymmetrical beam such as provided by a laser diode into a fiber optic cable. The coupler comprises at least one fiber optic cable having a longitudinally-formed approximately flat entrance facet and a cylindrical curved reflective surface formed on a first end. The curved reflective surface defines a line focus proximate to the entrance facet. A support structure situates the entrance facet proximate to the laser diode so that the line focus is approximately aligned with the narrow output aperture of the laser diode. The fiber optic cable may have any cross-section, such as circular, rectangular, or square. The fiber optic cable also includes a main body for receiving and transmitting the coupled laser radiation, and an output end having an approximately flat exit facet for outputting the laser radiation. The coupler is particularly useful for coupling multiple output beams from a laser diode array into a plurality of fibers that are collected on their output ends to approximate a single beam, which can be then applied to end-pump a solid state laser.

33 Claims, 7 Drawing Sheets

SIDE INJECTION FIBER OPTIC COUPLER

BACKGROUND OF THE INVENTION

1. Field of the Invention

The present invention relates to fiber optic couplers for coupling a beam of electromagnetic radiation into a fiber optic cable, and particularly to couplers for coupling the rapidly diverging laser beam from a laser diode into a fiber optic cable with high efficiency.

2. Description of the Related Art

A laser diode is a semiconductor device that emits laser radiation from a slit-like output aperture in response to an applied current. A laser diode may have a single output aperture or, for high power uses, multiple output apertures in an array of laser diodes can provide multiple beams.

Laser diodes are a particularly efficient source of laser radiation, and it is often advantageous to couple the laser radiation emitted from a laser diode or laser diode array through some type of fiber optic assembly to a remote location. For example, such coupling can be for the purpose of pumping a laser device or for any purpose wherein it is desired to transfer the output power of the laser diode to a remote point, such as applications involving illumination, metal processing and laser surgery. When multiple outputs are involved, the task of bringing all of the emitted light to a compact spot is complicated by the extent to which the individual emitters are geometrically spread along the length of the laser diode bar.

Coupling laser radiation into a fiber optic cable can be challenging because the diode laser's output characteristics differ significantly from those of gas or bulk solid state lasers insofar as the laser diode beam emerges from slit-like exit aperture. In one commercially available laser diode, the dimensions of such exit apertures are 200 microns by 1 micron and therefore, the angular divergence of the emerging beam is far greater in one axis (the "fast" axis) than in the other (the "slow" axis). For example, while the total angle of divergence along the slow axis may be only a few degrees, the divergence along the fast axis may approach 90°. To reduce the divergence of such asymmetric beams, a variety of optical systems have been used, depending upon the use to which the laser beam is put.

Some straightforward coupling approaches employ aspheric cylindrical lenses. For example, Burkhart et al. (U.S. Pat. No. 5,293,269) describes an aspheric cylindrical lens for collimating, with low optical aberrations, the asymmetrically diverging beams of diode laser arrays. Although disclosed in the context of diode laser arrays, this technique is highly applicable to single emitters.

An approach specifically directed toward arrays is described by Snyder et al. (U.S. Pat. No. 5,081,639), which discloses a diffraction limited, high numerical aperture cylindrical microlens that is physically attached to the diode array itself. Baer, (U.S. Pat. No. 5,127,068) describes a means for using a small diameter multimode optical fiber with a low numerical aperture as a microlens to collimate the output emissions of a laser diode before butt coupling the output of the laser diode to an optical fiber.

A microlens/reflector device is described in Endriz (U.S. Pat. No. 5,168,401). Endriz discloses a complex system that includes multiple reflective elements that, in general, have two reflecting surfaces that rotate a source beam such that the source axis initially parallel to the line passing through all sources is rotated to be perpendicular to the line passing through all sources. According to Endriz, the system can reformat beams from multiple sources of arrays of semiconductor lasers in a brightness conserving manner that allows the reformatted beam to have arbitrary divergences in their respective dimensions.

Scifres et al. (U.S. Pat. No. 4,688,884) discloses a fiber optic coupling system comprising a phased array semiconductor laser and a multimode light transmitting fiber having a squashed input end. In U.S. Pat. No. 4,820,010, Scifres et al. describe the same squashed fiber in the context of producing bright light output for optical pumping, communications, illumination and the like in which one or more optical waveguides receive light from one or more diode lasers or diode laser bars and transmit the light to an output end where it is focused or collimated into a bright light image.

The Scifres patents disclose that squashing the end of the fiber causes the cross-section of the fiber end to approximate an ellipse, the major axis of which is larger than the diameter of the continuing fiber, and the minor axis of which is smaller than that diameter. As a consequence, the numerical aperture (NA) of light radiation entering the squashed end of the fiber along the minor axis is decreased, while the NA of light entering along the major axis is increased which disadvantageously increases its divergence. Particularly, in a plane that lies perpendicular to the long axis of the diode array, the coupled radiation encounters the minor axis of the elliptical fiber end, which causes the numerical aperture associated with the radiation to decrease via multiple reflections as it propagates toward the cylindrical continuation of the fiber. In this manner, the large numerical aperture exhibited in this axis by diode lasers is effectively reduced so as to permit coupling to a fiber of lower numerical aperture. Along the orthogonal axis, the reverse occurs, as the progressively increasing angle of the neck of the squashed fiber increases the numerical aperture of the diode emission (i.e., increases its divergence) as it propagates toward the cylindrical continuation of the fiber, unfortunately reducing brightness and increasing transmission losses. Another disadvantage of Scifres' "squashed fiber" approach is that the beams' divergence is affected in a very non-symmetrical manner. For example, at the edges of the ellipse, the divergence is modified very differently than in the middle section.

SUMMARY OF THE INVENTION

The present invention provides a fiber optic coupler useful for efficiently coupling an asymmetrical beam that includes rapidly diverging laser radiation. The fiber optic coupler reduces the divergence (i.e. reduces the NA) of the beam in order to efficiently couple it into an optical fiber. The present invention is useful for an apparatus that couples an output beam from a laser diode into an optical fiber, and is particularly useful for coupling the multiple output beams from a laser diode array into a plurality of fibers that are then brought together on their output ends to approximate a single beam.

The fiber optic coupler for coupling a light source into a fiber optic element comprises an approximately flat entrance facet longitudinally formed in a first end of the fiber optic element, and a cylindrical curved reflective surface is formed on the first end adjacent to the entrance facet. Radiation input through the entrance facet is reflected from the curved reflective surface to substantially reduce the divergence of the coupled radiation and direct it approximately along a central axis defined by the fiber optic element, within the numerical aperture defined by the fiber optic element. Preferably, the shape of the curved reflective surface and the position of the light source is such that the light is directed as parallel to the central axis of the fiber optic element as possible. The cylindrical curved reflective surface defines a line focus situated proximate to, and outside of the entrance facet. Preferably, the cylindrical curved reflective surface comprises a parabolic shape and the optical line focus is defined by the parabolic shape. The light source is situated proximate to the line focus and directed toward the entrance facet so that it reflects off the curved reflective surface.

In an embodiment wherein the light source is an array of laser diodes, each output aperture of the laser diode array provides an asymmetrical beam having a fast axis and a slow axis. A plurality of optical fibers is provided, each having a coupling end including a longitudinally-formed entrance facet and a cylindrical curved reflective surface formed on the end with the cylindrical axis perpendicular to the central axis of the fiber. A support structure situates each of the entrance facets in a first predetermined configuration proximate to the laser diode array, so that the fast axis of each output beam is aligned perpendicular to the cylindrical axis of the curved surface.

In one embodiment of a housing, the exit facets of the fiber optic cables are situated in a closely positioned adjacent relationship within the housing, to provide a collective output beam. A solid state laser is provided including a laser cavity and a solid state gain material situated therein, and the collective output beam is applied to end pump the solid state gain material and thereby provide lasing operation of the solid state laser.

Optical analysis indicates that extraordinarily high coupling efficiency (approaching 100%) can be achieved, resulting at least partially from a substantial reduction of the beam divergence in the rapidly diverging section. Particularly, wherever the rapidly diverging beam interacts with the curved reflective surface, the beam's divergence is reduced upon reflection. Light entering along the slow axis sees only the cylindrical axis of the curved reflective surface, therefore the curved surface is seen as flat, and as a result the relatively low divergence is maintained. By accurately positioning the source and proper design of the curved reflective surface, the divergence (and therefore the numerical aperture of the beam) is reduced by reflection to well within the numerical aperture of the fiber. Reduced divergence (i.e. reduced numerical aperture) has several advantages, including increased transmission efficiency (i.e. reduced transmission losses), and increased brightness. Although in practice the increase in brightness caused by reducing the beam's divergence is offset partially or wholly, by expansion of the beam to fill the fiber's cross-section, the increase in brightness operates to provide a higher quality output beam. For example, the low numerical aperture is particularly useful to efficiently pump solid state gain material.

The coupler is formed on the end of the fiber, and therefore is advantageously integral with the fiber. By using an integrally-formed coupler, only two components—the tapered section and the laser diode output—are required to be precisely aligned to direct and couple light into an optical fiber. Using previous couplers that require a lens in addition to the laser diode and fiber optic cable, three components (the diode laser, the lens fiber and the receiving fiber) were required to be precisely aligned with each other.

Optical analysis indicates that the polarization of the light source coupled into the fiber will be substantially preserved. Furthermore, each of the beams exiting from the fiber exit facets should exit with the same direction of polarization. A polarized beam can be useful in applications where the beam must be switched by an electro-optic switch, for example. Another use for a polarized beam is for back-lighting an LCD (liquid crystal display).

The fiber optic cable can have any shape, such as circular, elliptical, rectangular or square. In a preferred embodiment, the optical fibers comprise a square cross-section that allows them to be closely packed at the output. Furthermore, it is believed that the square fiber will preserve polarization better than the circular fiber.

BRIEF DESCRIPTION OF THE DRAWINGS

The foregoing, together with other objects, features and advantages of this invention, will become more apparent when referring to the following specification, claims and the accompanying drawings, wherein:

DETAILED DESCRIPTION OF THE PREFERRED EMBODIMENTS

This invention is described in a preferred and alternative embodiments in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention. U.S. patent application Ser. No. 08/642,305, filed May 3, 1996, entitled "HIGH EFFICIENCY FIBER OPTIC COUPLER THAT REDUCES BEAM DIVERGENCE", by the same inventor as herein and assigned to a common entity, discloses a fiber optic coupler having a tapered end including an input facet through which laser radiation can be coupled longitudinally (i.e. on-axis with the fiber optic cable). The more divergent radiation coupled through the input facet is reflected off one or more of the flat tapered surfaces in order to reduce the angle of divergence for efficient coupling into the fiber and eventual transmission therethrough.

Figure 1:
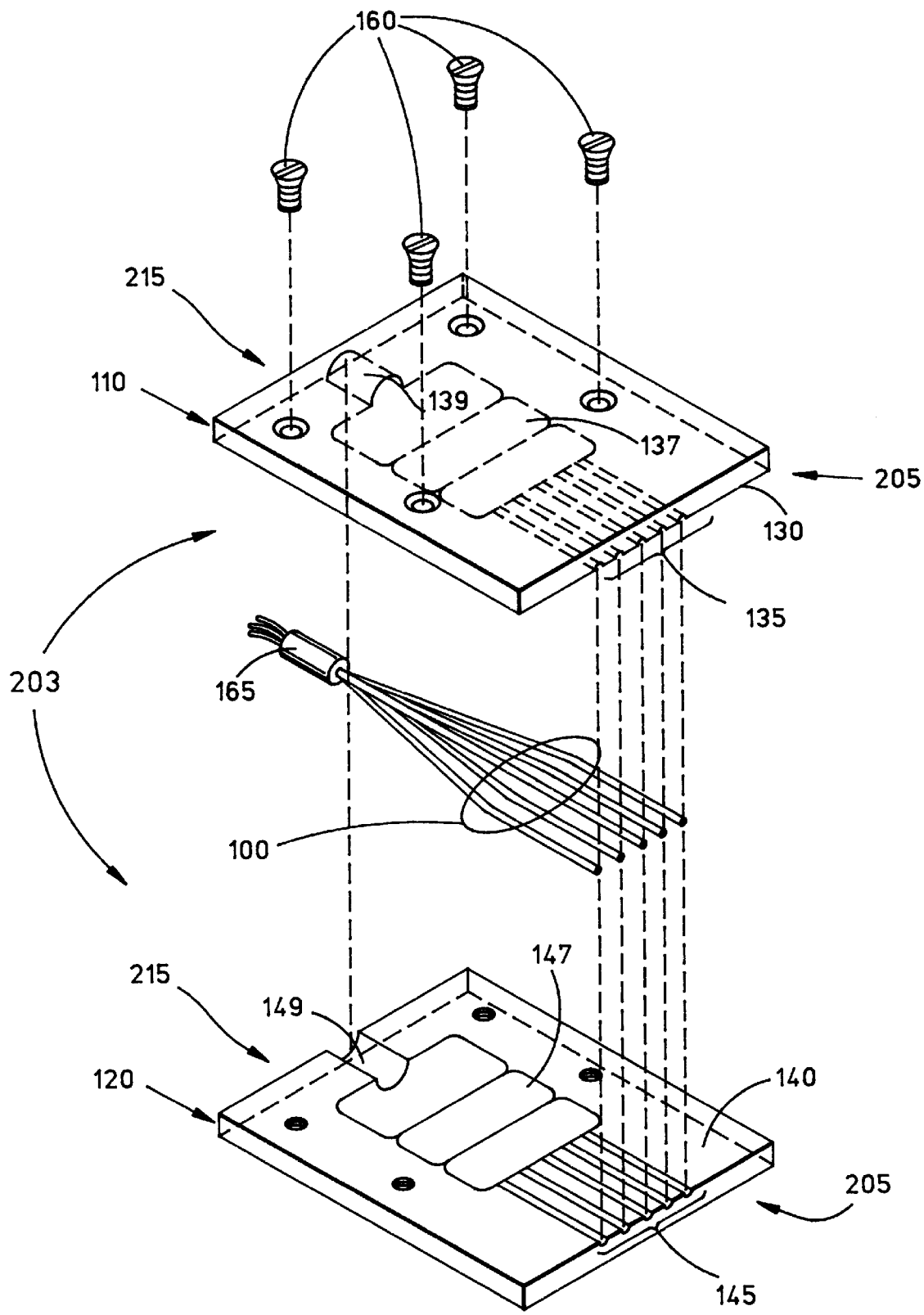
FIG. 1 is an exploded view of a housing and a plurality of fiber optic cables to be positioned therein during manufacturing in accordance with the present invention.

Reference is first made to FIGS. 1–4 to show a preferred method of making the preferred fiber optic coupler of the invention. FIG. 1 is an exploded view of a plurality of fiber optic cables 100 positioned between an upper housing section 110 and a lower housing section 120 that together comprise a housing 203 for the fiber optic cables. The fiber optic cables 100 may comprise any suitable material such as quartz, and preferably, each fiber optic cable includes a conventional core encased in a cladding. The fiber optic cables may have any suitable cross-section, such as circular, elliptical, rectangular or square, and a diameter of, for example, 100 to 600 microns. The fiber should be wide enough to receive the full beam width of an individual diode source (e.g. 100 to 200 microns) yet small enough to minimize the brightness reduction caused by coupling a relatively smaller cross-section beam into the larger cross-section of the fiber. One preferred diameter is between about 100 and 300 microns. A central axis is defined through the center of the cross-section of each fiber optic cable.

For reasons including cost and availability, the coupler may be implemented with a circular cross-section. Advantageously, cylindrical fibers have low cost, ready availability, and can be easily positioned and assembled for the purposes described herein. However, it is believed that a square cross-section is preferable for polarization preservation.

A support structure for the fiber optic cables is provided by a housing that includes the upper and lower housing sections 110 and 120, which may be constructed of aluminum. For the preferred embodiment, the housing is formed of a hard material, such as ceramic, glass, quartz, or a hard metal. In this preferred embodiment, hard materials are chosen so that their grinding characteristics are similar to those of the fiber optic cable and therefore, a housing made of such hard materials can facilitate subsequent operations that grind and polish the housing together with the fiber optic cables to a predefined configuration.

The upper section 110 initially comprises an approximately box-like configuration having an inner surface 130 that includes a plurality of grooves 135 extending inwardly from an input side 205 to a hollowed area 137, connected to a half-cylindrical groove 139 between the hollowed area 137 and opposite or output end 215. The inner surface 130 is designed to match a corresponding inner surface 140 on the lower half which also is formed with a plurality of grooves 145 extending inwardly from the input side 205 to a hollow area 147, which is similarly connected to a half-cylindrical groove 149 between the hollow area 147 and opposite or output end 215. The grooves 135 and 145 are each designed to securely hold one of the fiber optic cables 100 in position between them, and the hollow areas 137 and 147 are designed to provide unrestricted passage of the fiber optic cables. The cylindrically shaped grooves 139 and 140 are designed to securely hold together the output ends of the cables 100. Preferably, the housing 203 is designed so that path of the fiber optic cables 100 has a minimum of bending angles, thereby minimizing transmission losses.

The upper section 110 and the lower section 120 of the housing are held together by any suitable affixing means, such as screws or bolts 160 that are inserted through suitable holes formed therein. Appropriate adhesives or clamps, among other means, could also be used to secure the housing sections together. In order to properly position the bundle of fiber optic cables 100 in its output groove 139, 140, a sleeve 165 may first be inserted over the fiber optic cables, and then the sleeve with the fibers running therethrough is positioned in the output groove. An epoxy or some other adhesive material is useful to hold the fibers in position at the output ends, and particularly around the sleeve. The adhesive may also be used to hold the fibers at the input ends within the grooves 135, 145, if desired.

Figure 2:
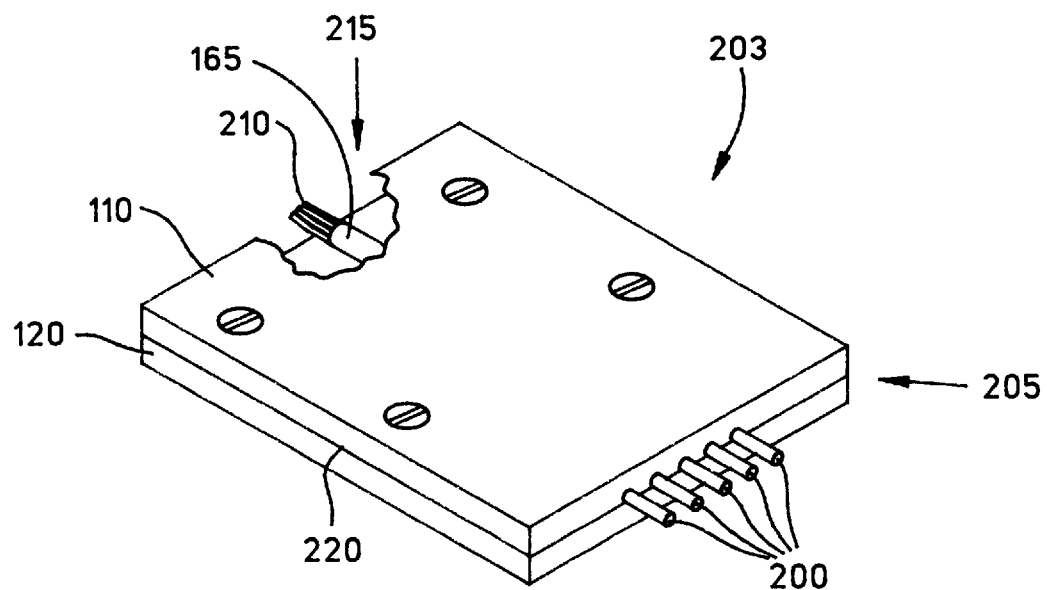
FIG. 2 is an assembled view of the unfinished housing of FIG. 1 with the fiber optic cables positioned therebetween.

Reference is now made to FIG. 2 which is a perspective view of the structure in which the upper section 110 has been assembled to the lower section 120, forming a housing assembly 203 with the plurality of fibers 100 extending therethrough. In FIG. 2 the coupler is still unfinished: the enclosed fiber optic cables include a section 200 protruding from the input end 205 of the housing, and a plurality of closely positioned ends 210 protruding from the output end 215 of the housing. The protruding fiber ends on the input end 200 are cut as closely as possible to the input surface 205 of the housing and then the input facets and the cylindrically curved reflective surfaces are formed on each fiber in a manner discussed in detail elsewhere herein, for example, with reference to FIGS. 4–9. Initially, the protruding ends 210 at the output side are cut as closely as possible to the output end 215 and then the output ends of the fiber optic cable 210 are ground and polished to provide a flat exit facet on each of the fibers. As a result, the exit facets are formed approximately parallel with each other and flush with the output side of the housing.

Figure 3:
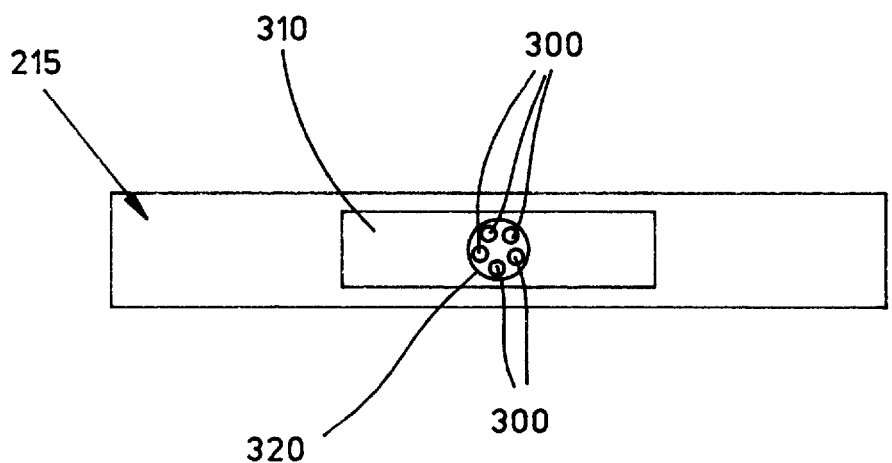
FIG. 3 is a plan view of the output end of the housing of FIG. 2.

FIG. 3 is a plan view of the output end 215 polished so that the exit facet 300 of each fiber optic cable provides a smooth flat surface. As shown in FIG. 3, an optional glass plate 310 is utilized on the output end to provide a surface that has grinding characteristics similar to the optical fibers, and thus the glass plate 310 advantageously facilitates grinding and polishing the exit facets 300 to as smooth a surface as possible. The glass plate 310 may be affixed before grinding by any suitable means such as a suitable adhesive.

The closely positioned and bundled fibers provide a geometrically compact pupil 320. At the exit facet, each fiber provides a discrete beam that is very closely positioned with beams from adjacent exit facets. However, as the beams travel into the far field, the divergence of each individual beam will eventually overlap with its neighbors to provide a single beam. In one embodiment, which will be discussed with reference to FIG. 13, the collected beams are focused tightly into a solid state laser, and each of the output beams becomes extremely closely positioned at the focal point, approximating a single focused beam. Thus, the coupler described herein is particularly useful for coupling light from a laser diode array into a plurality of fiber optic cables and providing an approximately single output beam.

Figure 4:
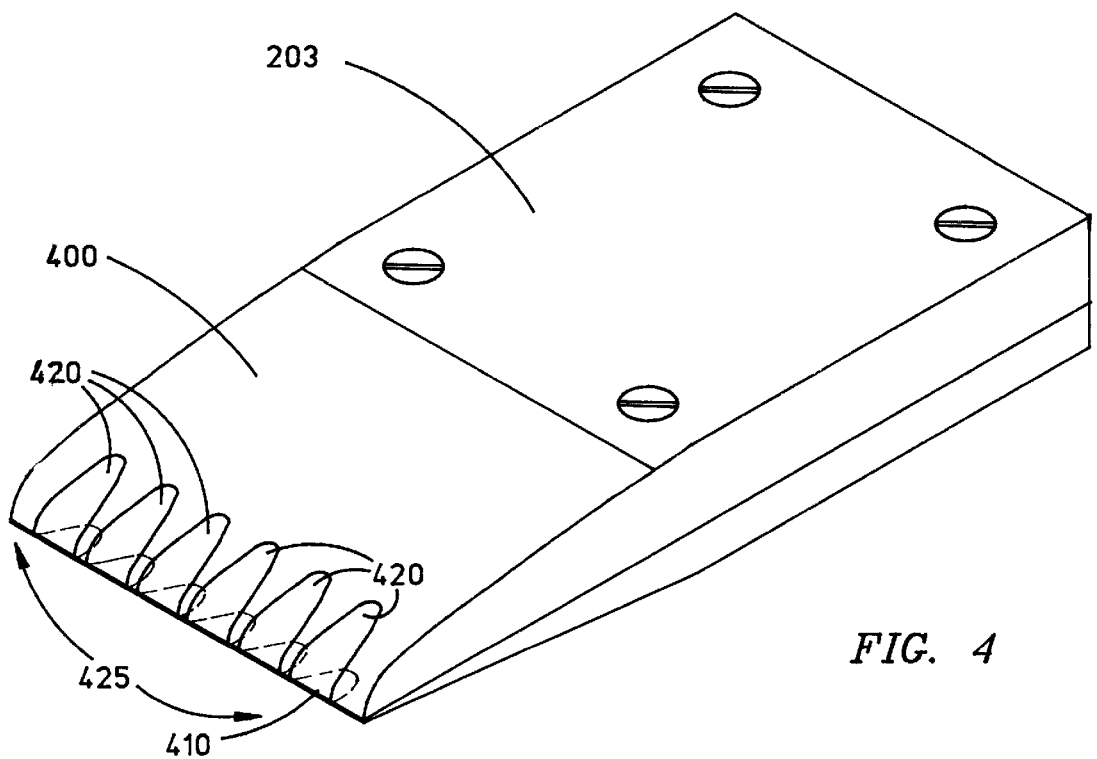
FIG. 4 is a perspective view of a complete, assembled housing of the invention.
Figure 5:
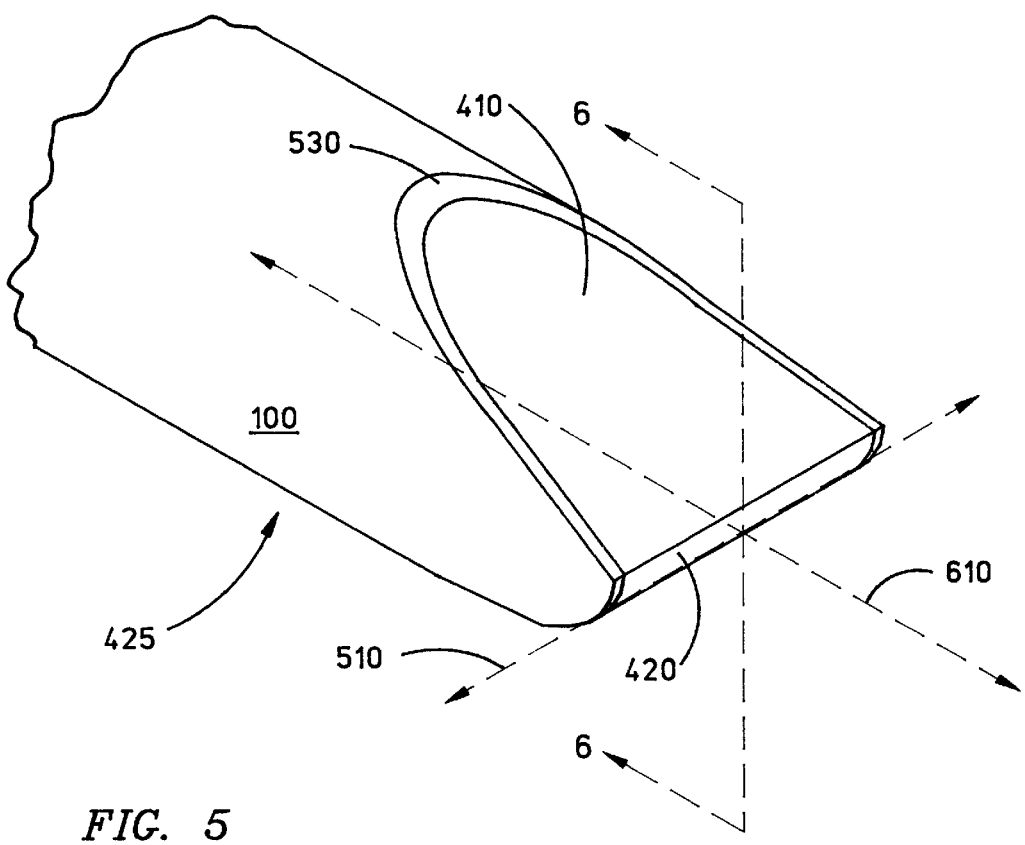
FIG. 5 is a perspective view of a coupler formed on a first end of one of the fiber optic cables, including an entrance facet and a cylindrical curved reflective surface.

Reference is now made to FIGS. 4 and 5. FIG. 4 is a perspective view of assembled housing 203 in which a finished end 400 has been formed so that entrance facets 410 and cylindrical curved reflective surfaces 420 define a coupler 425 on a first end of the fiber optic cables. FIG. 5 is a perspective view of the first end of one of the fiber optic cables 100 in which the entrance facet 410 and the cylindrical curved reflective surface 420 have been formed. To facilitate formation of these surfaces, the housing 203 provides a firm structure upon which to grind and polish the desired shape. The grinding and polishing operation creates the cylindrical curved surface and the approximately flat input facet 410. During formation, the housing in FIG. 4 is also subject to grinding and polishing together with the fiber optic cables, and hence, the shape of the coupler will also be mirrored in the housing. The method of making the fiber optic coupler described herein that utilizes the housing to maintain the fibers in position for processing is particularly useful for smaller diameter (100–300 micron) fibers and multiple fiber configurations. For larger diameter fibers (greater than 500 microns), the fibers could be individually tapered and mounted without the necessity of utilizing the housing as described.

Figure 6:
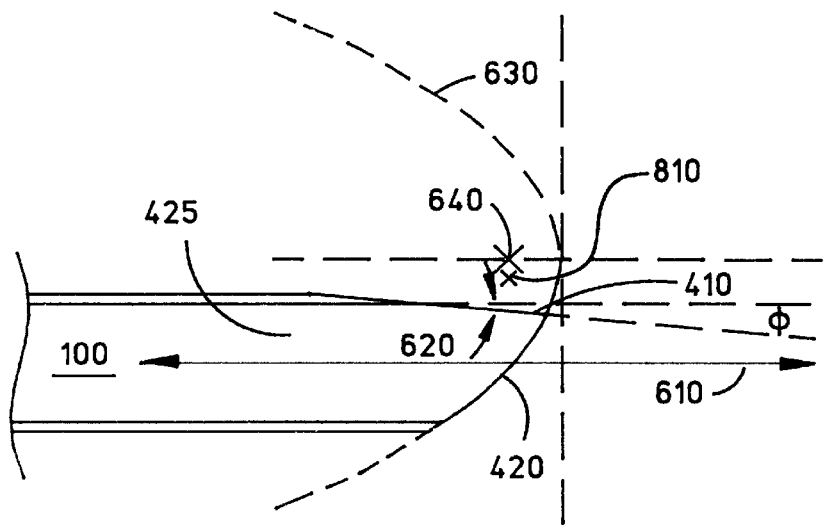
FIG. 6 is a cross-section of the fiber first end of FIG. 5, showing the preferred parabolic shape of the cylindrical curved surface, the mathematically-defined focal point, and the optical focal point.
Figure 7:
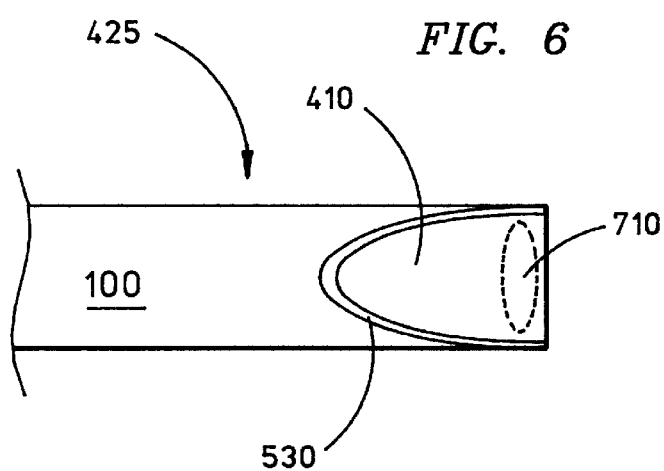
FIG. 7 is a top plan view of the coupler of FIG. 5, showing the entrance facet.

Reference is now also made to FIGS. 6 and 7 in conjunction with FIG. 5. FIG. 6 is a cross-section of the coupler 425 of FIG. 5, showing the preferred parabolic shape of the curved cylindrical surface 420. FIG. 7 is a top plan view of the approximately flat top entrance facet 410. The flat entrance facet 410 is formed longitudinally (i.e. approximately parallel with the central axis) by a flat grinding and polishing process that can be performed by one skilled in the art of precision grinding of micro-scale components. During this process, the cladding is removed so that the entrance facet is defined by a portion of the central core. The grinding process of the entrance facet leaves a ring-shaped section 530 of cladding material surrounding the entrance facet.

The entrance facet 410 preferably has a flat shape with a width sufficient to provide a flat surface for coupling light from the slit-like output aperture of a laser diode and accordingly, the width of the fiber and the depth of the cut into the fiber should be chosen to provide these dimensions. An exemplary input area is shown at 710 on the entrance facet. For some embodiments, it may be preferable for the entrance facet 410 to be formed parallel with a central axis 610 defined through the center of the fiber. However, practical manufacturing considerations may require that the entrance facet have some small angle, such as 5°, with respect to the central axis as shown by the angle φ shown at 620.

Preferably, the entrance facet 410 is coated with an anti-reflection coating to improve coupling efficiency. Such a dielectric AR coating is designed to efficiently transmit the wavelength of the beam input through it, and one example of such a dielectric coating is a single layer of magnesium fluoride ($MgF_2$). However, in a preferred embodiment the dielectric coating comprises multiple layers of any conventional dielectric material that provides more efficient transmission.

The cylindrical curved surface 420 is formed so that the cylindrical axis (exemplified by a line 510 in FIG. 5) is approximately parallel with the surface of the entrance facet 410. As shown in FIG. 6, the curve defined by the curved reflective surface is preferably that of a parabola 630 having a mathematically-defined line focus 640 situated outside of the entrance facet, preferably along a line parallel with a plane defined by the entrance facet 410. The mathematically-defined line focus 640 will necessarily be parallel with the cylindrical axis of the curved reflective surface 420, and therefore will be approximately perpendicular to the central axis of the fiber. An optical line focus 810 is defined by the curved reflective surface, the refractive index of the fiber material, and the shape of the entrance facet. The optical line focus provides a reference point for positioning the output aperture of the light source.

Figure 8:
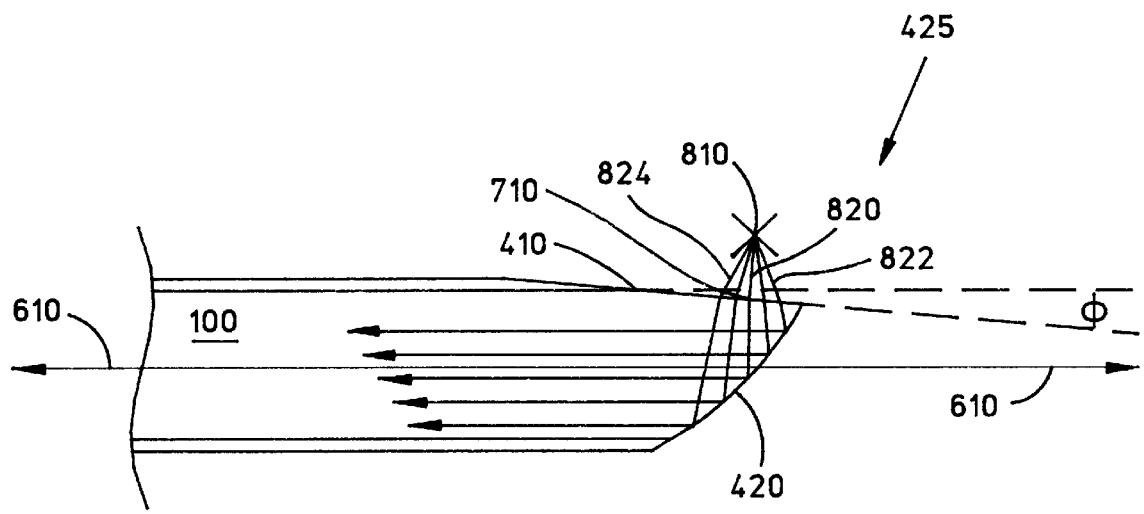
FIG. 8 is a cross-sectional view of the coupler of the invention with a ray tracing showing widely diverging radiation emitted from a source being reflected from the curved reflective surface to reduce its divergence, for coupling into the fiber optic cable.

Reference is now made to FIG. 8 which is a cross-sectional view of the coupler 425 of the optical fiber 100 as in FIG. 6, showing a ray tracing of widely diverging radiation emitted from an area 810 placed proximate to the optical line focus of the curved reflective surface 420. The optical focus at 810 may not be exactly equivalent to the mathematically-defined line focus 640 shown in FIG. 6, due to the refraction that occurs when the light passes through the entrance facet 410. For purposes herein "line focus" will be defined as the optically-defined line focus.

The light emitted from the light source 810 may be divided for purposes of discussion into several rays. A central ray 820 is defined to have a divergence of zero. Two highly divergent rays 822 and 824 are symmetrically spaced from the central ray. At the surface 710 through which the light source is coupled through the entrance facet, refraction occurs to slightly reduce the angle of divergence of all beams entering the optical fiber. Each ray, whether at 0° divergence or at the maximum divergence, is reflected off the curved reflective surface and, due to the parabolic shape of the curved reflective surface and also due to the precise positioning of the light source at the optical focus 810 of that surface, is reflected approximately parallel with the central axis 610. However, in practice the curved reflective surface may have a shape that is not precisely parabolic while still having a shape sufficient to reflect the light off the surface at an angle within the acceptance capabilities of the optical fiber. Furthermore, there may be variations due to less than precise placement of the light source at the optical focus, thereby also slightly varying the angle of the divergence. Radiation having a numerical aperture of 0.2 at angles up to 11.6° cannot escape from a fiber. Hence, all rays are reflected to reduce their divergence to within the numerical aperture, and therefore all rays having a lesser divergence (with respect to the central axis, of course) are substantially trapped within the fiber. In other words, as long as the ray is reflected off the curved reflective surface with a divergence sufficient to couple into the fiber (e.g. 5.8° is a common figure), a high coupling efficiency will be achieved. All these factors should be taken into account when designing a particular curved reflective surface and situating the light source proximate thereto.

Figure 9:
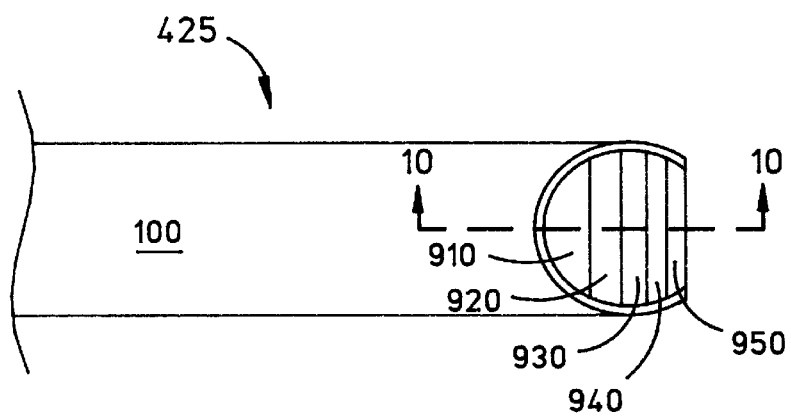
FIG. 9 is a plan view of a faceted approximation to the curved reflective surface of FIG. 8.
Figure 10:
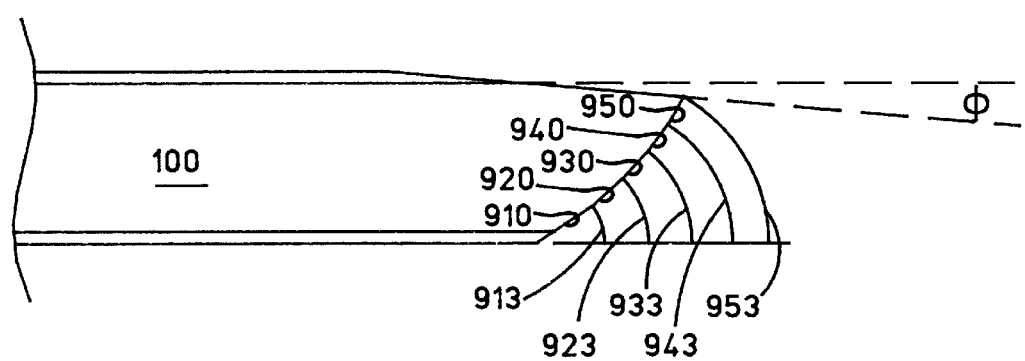
FIG. 10 is a cross-sectional view of the first end shown in FIG. 9 in which a faceted approximation has been formed.

Reference is now made to FIGS. 9 and 10. FIG. 9 is a plan view of a faceted approximation to a curved reflective surface formed on the first end of the fiber optic cable 100. FIG. 10 is a cross-sectional view of the coupler 425 of the faceted configuration of FIG. 9. The faceted approximation shown in FIGS. 9 and 1 0 is a preferred method for forming the cylindrical curved reflective surface 420, using processes analogous to that used to form jewelry. In this process, a series of approximately flat facets are formed, each facet lying tangent to a section of the desired parabolic curve. FIGS. 9 and 10 show a first facet 910 formed at a first angle 913, a second facet 920 formed at a second angle 923, a third facet 930 formed at a third angle 933, a fourth facet 940 formed at a fourth angle 943, and a fifth facet 950 formed at a fifth angle 953. Of course, other embodiments may have different numbers of facets and different angles. The angles and the distances are chosen to approximate a preferred parabolic surface. In one embodiment, the first, second, third, fourth, and fifth angles are 28°, 35°, 42°, 50°, and 57°, respectively, and the angle φ between the entrance facet 620 and the central axis is approximately 5°. After the step-faceting process is complete, the faceted surface may be polished to at least partially smooth the steps, and the polishing continues until a desired specification is met. It is preferable that the cylindrical curved surface be polished sufficiently in order to remove the steps as much as possible because this will provide the most effective divergence reduction. Furthermore, to increase reflectivity it is preferable to polish the surface as smooth as possible. However, cost limitations and practical constraints may dictate that some portion of the steps remain, or even that the steps be allowed to remain intact (i.e. without additional grinding and polishing). When formation of the curved reflective surface is complete, a multilayer dielectric coating is deposited on the cylindrical curved surface in order to improve its reflectivity and thereby improve coupling efficiency.

Figure 11:
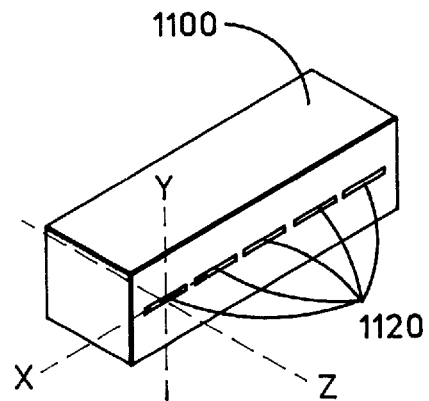
FIG. 11 is a perspective view of a prior art laser diode array comprising a plurality of output apertures.

Reference is now made to FIG. 11, which is a perspective view of a laser diode array 1100 comprising a plurality of output apertures 1120. Such output apertures typically have a long dimension and a narrow dimension; for example 200 microns by one micron, respectively. In operation, each of the laser array's output apertures 1120 emits a laser beam that is asymmetrically diverging, and the x-y-z axes shown at one of the output apertures in FIG. 11 can be used to define the beam emitted therefrom. For purposes of the present invention, any type of conventional laser diode is suitable. Although the following discussion describes a preferred embodiment in terms of a laser diode array, it should be apparent that the present invention would also be useful in a single laser diode (or any other divergent light source), and particularly for coupling the light from the single laser diode into a single optical fiber.

Figure 12:
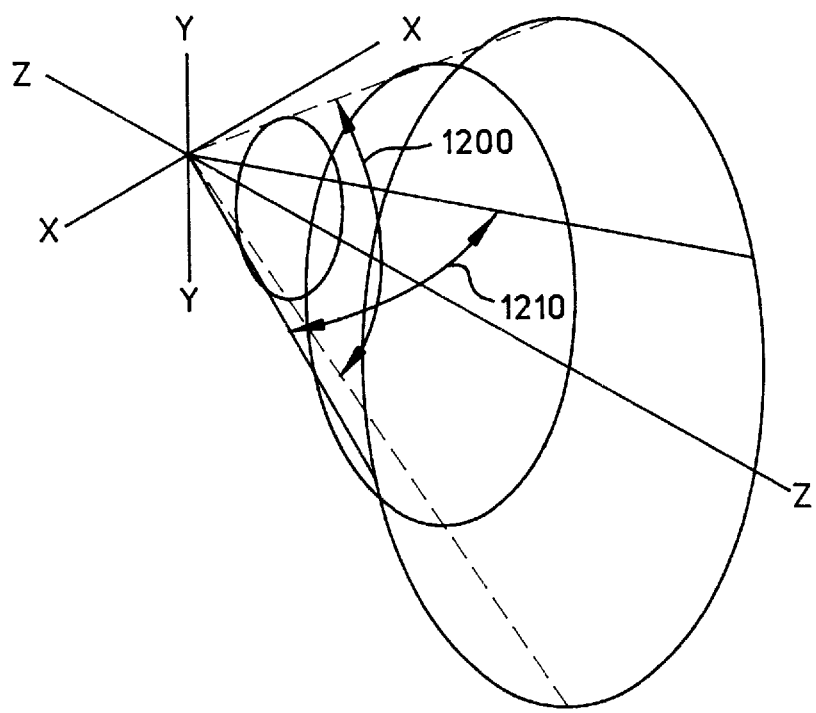
FIG. 12 is a graphical depiction of an output beam from one of the output apertures of the prior art laser diode array in FIG. 11.

FIG. 12 illustrates a beam emitted from one of the output apertures 1120. Particularly, the y axis of the output aperture 1120 defines a "fast" axis in which the beam is rapidly diverging, as illustrated in FIG. 12, at an included angle 1200 which may be as great as 90°, for example. At the same time, along the x axis which defines the "slow" axis, the beam may be diverging at a smaller included angle of divergence, as illustrated at 1210, which may be only about 5°. In order to couple the output beams into the entrance facets 410 (FIGS. 4 and 5) of each coupler, the couplers 425 are situated by the housing in a configuration predetermined to match that of the laser diode array 1100.

Figure 13:
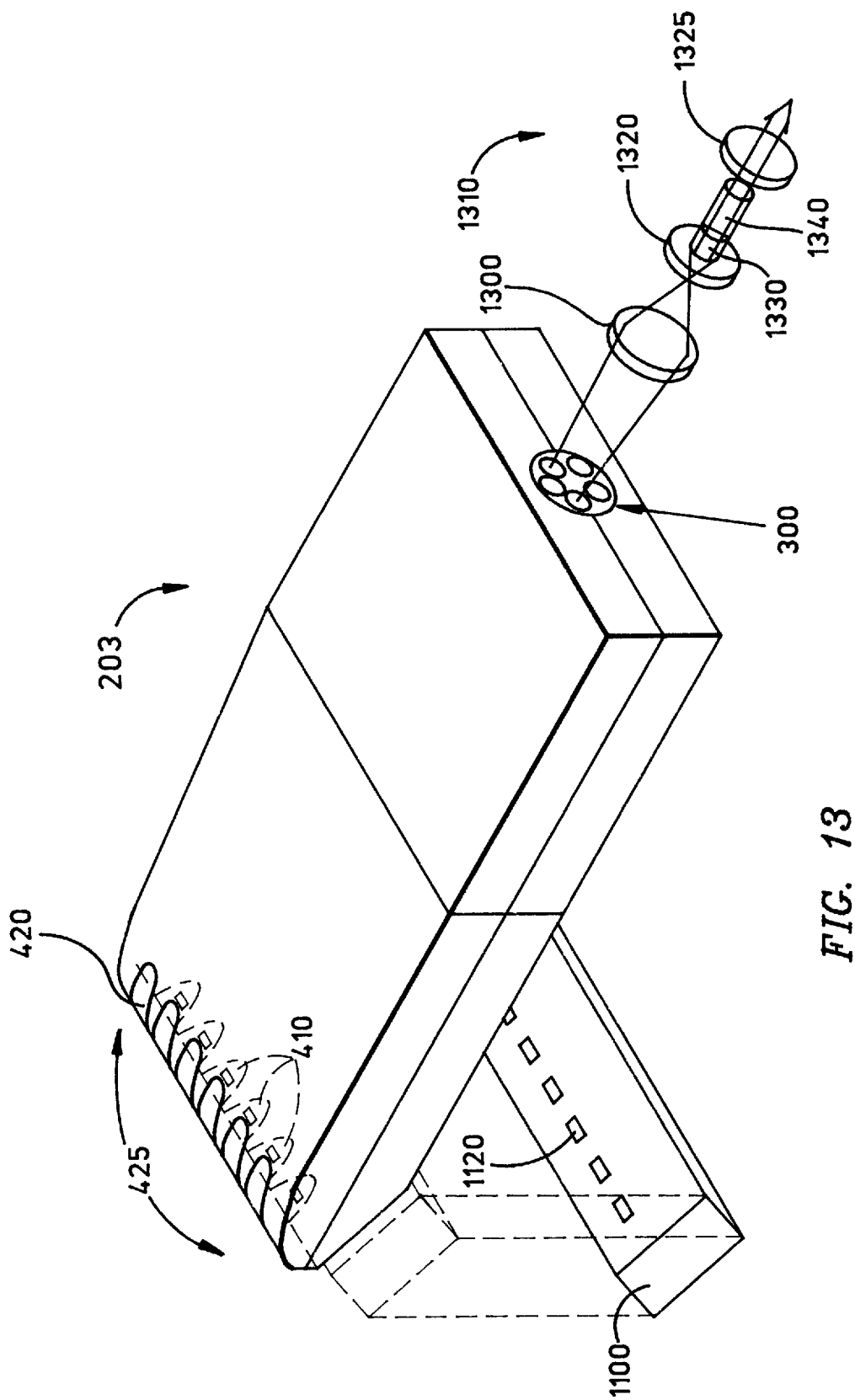
FIG. 13 is a perspective view of a laser diode array coupled by the fiber optic coupler of the invention to end pump a solid state laser.

Reference is now made to FIG. 13 which is a perspective view of a configuration in which the laser diode array 1100 is coupled via the coupler of this invention to end pump a solid state laser 1310. Particularly, the laser diode array 1100 is positioned proximate to the entrance facets 410 in a position (preferably at the optical focus of the curved reflective surface) to effectively couple the light thereto, and the center-to-center spacing of the entrance facets is arranged to match the center-to-center spacing of the output apertures 1120 of the diode array. In one embodiment, the output apertures have the dimensions of 1×200 microns, and the optical fibers within the housing have a cylindrical shape with an unfinished diameter of between 200 and 300 microns. Preferably, each output aperture is positioned closely enough to the entrance facet to direct all of the light emitted from the laser diode into the optical fiber, but far enough away to prevent burning the entrance facet and far enough away to avoid feedback (from reflections) into the laser diode. The entrance facets should have a width at least wide enough to accommodate the entire laser beam. For optimum coupling, the height of the input facet should be as small as practical and as close to the diode output as possible, without being so close as to sustain damage due to the high power density of the incident beam or to cause undesirable feedback into the diode.

The light coupled from the laser diode 1100 is transmitted through the optical fibers in housing 203 and then emitted from the output ends 300 of the optical fibers to provide a collective beam defined by the collection of the separate (but closely positioned) beams from the exit facets. These collected beams are applied through a conventional focusing lens 1300 into a solid state laser 1310 that comprises a laser cavity defined between an input coupler 1320 and an output coupler 1325. In a common embodiment, the end reflectors (i.e., the input and output couplers) for a solid state laser can be deposited directly on the faces of the solid state gain material. The input coupler 1320 is transmissive at the wavelength of the pump beam and reflective at the lasing wavelength. A solid state gain material 1330, positioned within the laser cavity, is pumped by the pump beam. An optional frequency doubling crystal 1340, or other nonlinear optical material, may be positioned within the laser cavity to transform the wavelength. Preferably, the beam is focused tightly near the input end of the gain material 1330 in order to "end pump" the gain material in a conventional manner. The output coupler 1325 for a laser is partially reflective at the output wavelength. If a doubling crystal is used, the output coupler is reflective at the lasing wavelength and transmissive at the doubled wavelength.

Optical analysis indicates that the coupler as described herein will have substantial polarization preservation properties. Polarization preservation is defined as the degree to which the polarization of the incoming light is preserved within the fiber. Furthermore, advantageously all beams are expected to exit with substantially the same direction of polarization. The polarization preservation properties may be useful for a number of uses, for example, for use within an electro-optic switch that switches the output beam. Another use for a polarized beam is to light an LCD (liquid crystal display) display. It is believed that the rectangular cross-section will provide the highest amount of polarization and therefore, for those uses in which polarization preservation is important, the rectangular cross-section fiber may be particularly useful.

Figure 14:
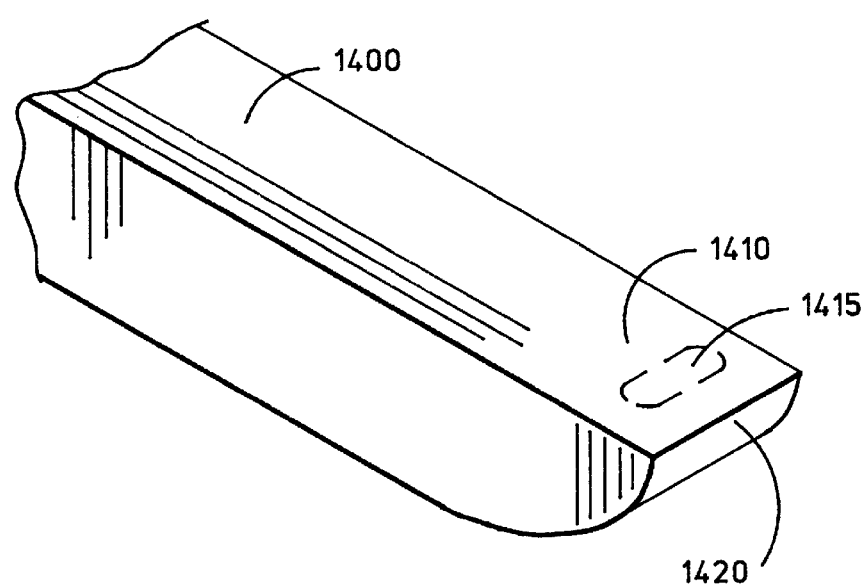
FIG. 14 is a perspective view of an alternative embodiment of a coupler of the invention in which the fiber optic cable has a rectangular cross-section.

Reference is now made to FIG. 14, which is an alternative embodiment of the side injection fiber, using a fiber 1400 having a rectangular (and preferably square) cross-section. An entrance facet 1410 is defined on an upper surface of the rectangular fiber 1400. To form the surface, the thin layer of cladding (if any) should be removed and then polishing is performed, followed by deposition of an anti-reflection coating for efficient coupling. An oval-shaped section 1415 on the entrance facet denotes an exemplary area for coupling a light source, such as the light from a laser diode. A curved reflective surface 1420 is formed on the end proximate to the entrance facet. The cylindrical curved surface 1420 for the rectangular fiber is exactly analogous with the cylindrical curved surface 420 described previously for the circular fiber. Therefore, the preferred shape is a parabola having a focus outside of the entrance facet 1410. In all respects, the surface 1420 for the rectangular fiber would function the same way as that for the circular fiber and would be useful to couple light from a laser diode as discussed previously.

Furthermore, the curved reflective surface 1420 and the entrance facet 1410 for the rectangular fiber could be formed within a housing in a similar process to that described with reference to FIGS. 1–4. Advantageously, use of a rectangular fiber reduces the grinding and other processing steps needed to form the entrance facet, and provides a flat surface for easy coupling and positioning the laser diode array in a reliable relationship thereto.

Optical analysis indicates that a rectangular fiber has excellent polarization preservation properties. Other advantages of using a rectangular (and preferably square) fiber is that it can be closely packed at the output side to provide a closely positioned output beam.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawing figures.

What is claimed is:

1. A fiber optic coupler for coupling a light source that includes rapidly diverging radiation into a fiber optic element that defines a central axis, the coupler comprising:
   an entrance facet longitudinally formed at a first end of the fiber optic element for coupling said rapidly diverging laser radiation into the fiber optic element; and
   a cylindrical curved reflective surface comprising an approximately parabolic shape formed on the first end adjacent to said entrance facet for reducing the divergence of said coupled rapidly diverging laser radiation and directing it along the central axis of the fiber optic element, wherein said approximately parabolic shape defines a line focus situated proximate to said entrance facet.

2. The coupler of claim 1, wherein said approximately parabolic shape is formed by a plurality of facets.

3. The coupler of claim 1, and further comprising a support structure for situating the light source approximately aligned with said line focus.

4. The coupler of claim 1, wherein said line focus is situated approximately parallel with said entrance facet.

5. A fiber optic coupler for coupling laser radiation into a fiber optic element along a central axis of said element from a laser diode having an output aperture having a long dimension and a narrow dimension, said laser radiation having a fast divergence along said narrow dimension, the coupler comprising:
   an approximately flat entrance facet formed proximate to a first end, said entrance facet being formed approximately longitudinally on said fiber optic element; and
   a cylindrical curved reflective surface formed on the first end proximate to the entrance facet, said cylindrical curved surface having a shape that defines a line focus approximately parallel with said entrance facet and perpendicular with said central axis.

6. The coupler of claim 5, and further comprising a support structure for situating the output aperture proximate to the line focus, wherein said support structure approximately aligns said output aperture with said line focus.

7. The coupler of claim 5, wherein said cylindrical curved shape comprises an approximately parabolic shape and the line focus is defined by said parabolic shape.

8. The coupler of claim 5, wherein said cylindrical curved shape comprises a faceted, approximately parabolic shape and the line focus is defined by said faceted parabolic shape.

9. The coupler of claim 5, and further comprising:
   an exit facet on a second end of the optical fiber element for outputting a laser beam;
   a solid state laser including a laser cavity and a solid state gain material situated therein; and
   means for applying said laser beam to end-pump said solid state gain material and thereby provide lasing operation of said solid state laser.

10. A fiber optic coupler for a laser diode array formed with a plurality of narrow output apertures each having a long dimension and a narrow dimension, each providing an asymmetrical output beam, the coupler comprising:
    a plurality of fiber optic cables each having:
       an approximately flat entrance facet formed proximate to a first end, said entrance facet being formed approximately longitudinally;
       a cylindrical curved reflective surface formed on the first end proximate to the entrance facet, said cylindrical curved surface defining a line focus proximate to said entrance facet;
       a main body for transmitting laser radiation; and
       a second end including an approximately flat exit facet for outputting said transmitted laser radiation; and
    a support structure for situating each of said entrance facets in a predetermined configuration proximate to said laser diode array, so that the line focus of each fiber optic cable is approximately aligned with the long dimension of each of the plurality of output apertures.

11. The coupler of claim 10, wherein said line focus is situated approximately parallel with said entrance facet.

12. The coupler of claim 10, wherein said cylindrical curved reflective surface comprises an approximately parabolic shape and the line focus is defined by said parabolic shape.

13. The coupler of claim 10, wherein said cylindrical curved reflective surface comprises a faceted, approximately parabolic shape and the line focus is defined by said faceted parabolic shape.

14. The coupler of claim 10, wherein said exit facets are situated in a closely positioned adjacent relationship within said housing to provide a collective output beam.

15. The coupler of claim 14, and further comprising:
    a solid state laser including a laser cavity and a solid state gain material situated therein, positioned so that said collective output beam can end-pump said solid state gain material and thereby provide lasing operation of said solid state laser.

16. A source of laser radiation comprising:
    a laser diode including at least one output aperture having a long dimension and a narrow dimension;
    at least one fiber optic cable having:
       an approximately flat entrance facet formed proximate to a first end, said entrance facet being formed approximately longitudinally on said fiber optic element;
       a cylindrical curved reflective surface formed on the first end proximate to the entrance facet, said cylindrical curved surface having a shape that defines a line focus proximate to said entrance facet;
       a main body adjacent to said tapered surface for receiving and transmitting laser radiation; and
       a second end including an exit facet for outputting the laser radiation transmitted through said main body of said fiber optic cable; and
    means for situating said laser diode proximate to the entrance facet so that the long dimension of the laser diode is approximately aligned with the line focus of the cylindrical curved reflective surface.

17. The laser source of claim 16, wherein said laser diode includes a plurality of output apertures that defines a laser diode array, and further comprising:
    a plurality of fiber optic cables, each respectively positioned so that its entrance facet is situated proximate to a respective output aperture of the laser diode, so that the long dimension of the laser diode is approximately aligned with the line focus of the cylindrical curved reflective surface proximate thereto.

18. The laser source of claim 16, wherein said line focus is situated approximately parallel with said entrance facet.

19. The laser source of claim 16, wherein said cylindrical curved reflective surface comprises an approximately parabolic shape and the line focus is defined by said parabolic shape.

20. The laser source of claim 16, wherein said cylindrical curved reflective surface comprises a faceted, approximately parabolic shape and the line focus is defined by said faceted parabolic shape.

21. The laser source of claim 16, wherein said fiber optic cable has a circular cross-section.

22. The laser source of claim 16, wherein said fiber optic cable has a rectangular cross-section.

23. The laser source of claim 22, wherein said fiber optic cable has an approximately square cross-section.

24. The laser source of claim 16, and further comprising:
   a solid state laser including a laser cavity and a solid state gain material situated therein; and
   optical means for applying said laser beam from said exit facet to end-pump said solid state gain material and thereby provide lasing operation of said solid state laser.

25. A method for forming a fiber optic coupler on a fiber optic cable that defines a central axis comprising the steps of:
   a) forming an approximately flat input facet along a side of the fiber optic cable proximate to a first end, said input facet formed approximately parallel to the central axis;
   b) forming a curved reflective surface on said first end in an operative relationship with said flat input facet to reflect laser radiation coupled through said flat input facet in a direction approximately along the central axis.

26. The method of claim 25, wherein said cylindrical curved reflective surface is formed so that said line focus is situated approximately parallel with the entrance facet.

27. The method of claim 25, wherein said cylindrical curved reflective surface is formed to comprise an approximately parabolic shape and the line focus is defined by said parabolic shape.

28. The method of claim 25, wherein said cylindrical curved reflective surface is formed to comprise a faceted, approximately parabolic shape and the line focus is defined by said faceted parabolic shape.

29. A method for coupling an asymmetrically diverging laser beam into a fiber optic cable comprising the steps of:
   providing an integrally-formed coupler having an approximately flat entrance facet longitudinally formed in a first end of the fiber optic element and a cylindrical curved reflective surface formed on the first end adjacent to said entrance facet, said cylindrical curved surface having its cylindrical axis perpendicular to the central axis of the fiber optic cable;
   providing an asymmetrically diverging optical beam that defines a fast axis and a slow axis;
   coupling said asymmetrically diverging optical beam through the entrance facet on the integrally-formed coupler;
   reflecting a portion of the optical beam diverging along the fast axis from the curved reflective surface to reduce the angle of divergence along the fast axis and direct the radiation with the reduced divergence approximately along the central axis of the optical fiber; and
   transmitting said optical beam through the fiber optic cable with the fast axis having a reduced divergence.

30. The method of claim 29, and comprising the further step of generating said asymmetrically diverging laser beam by operating a laser diode.

31. The method of claim 29, and comprising the further steps of:
   outputting the reduced-angle beam from an exit facet on the fiber optic cable to provide a pump beam; and
   applying said pump beam to end-pump a solid state gain material positioned within an optical cavity.

32. The method of claim 29, and comprising the further steps of:
   providing a laser diode array that has a plurality of outputs, each output supplying an asymmetrical laser beam having a fast axis and a slow axis; and
   aligning the entrance facets and the housing so that the entrance facets of the fiber optic cable are situated with respect to the laser diode outputs to receive the asymmetrical laser beam with the fast axis approximately perpendicular to the cylindrical axis of the curved reflective surface.

33. A method for forming a fiber optic coupler on a fiber optic cable that defines a central axis comprising the steps of:
   a) forming an approximately flat input facet along a side of the fiber optic cable proximate to a first end; and
   b) forming a cylindrical curved reflective surface to comprise an approximately parabolic shape on said first end in an operative relationship with said flat input facet to reflect laser radiation coupled through said flat input facet in a direction approximately along the central axis.

* * * * *